UNITED STATES PATENT OFFICE.

JOHN L. MALM, OF DENVER, COLORADO.

PROCESS OF TREATING ORES TO PRODUCE LEAD CHLORID AND CHLORIN GAS.

1,258,800. Specification of Letters Patent. Patented Mar. 12, 1918.

No Drawing. Application filed December 12, 1914. Serial No. 876,981.

*To all whom it may concern:*

Be it known that I, JOHN L. MALM, a citizen of the United States, residing at Denver, in the county of Denver and State of Colorado, have invented certain new and useful Improvements in Processes of Treating Ores to Produce Lead Chlorid and Chlorin Gas, of which the following is a specification.

This invention relates generally to processes for treating metal bearing materials and particularly to a process for producing lead chlorid and making up the loss or shrinkage in chlorin in the chlorination process.

The process specifically stated consists in subjecting dry crushed sulfid ores containing lead to the action of chlorin and moisture in sufficient quantities to form lead sulfate and hydrochloric acid. This action is brought about in any suitable receptacle, such as a tube mill, and if there is not sufficient internal heat, external heat is supplied to make up this deficiency. Hydrochloric acid comes off as gas and is collected in any suitable manner for use in the process, while the lead sulfate remains with the ore. The ore is then mixed with a hot saturated solution of any salt, which is susceptible of giving its chlorin over to the lead sulfate in the mass, the temperature being maintained at a point which will give the greatest possible reaction. I prefer to use a concentrated or saturated solution of common salt and water. The result of this treatment is that lead chlorid and sodium sulfate are formed. When the solution is allowed to cool, the lead chlorid is thrown down and may be collected in any suitable manner and treated to liberate the chlorin gas. This treatment of the ore containing the lead sulfate is conducted in any suitable apparatus, as for example, in a combined agitator and filter barrel. During the steps of the process, the other metal contents of the ore have been converted into chlorids and they may be treated in any suitable manner to obtain the values.

Having described my invention, I claim:—

1. The process of treating substances containing lead and other sulfids, consisting in subjecting the substance to the action of chlorin gas in the presence of moisture at a temperature high enough to convert substantially the entire lead content into lead sulfate with hydrochloric acid as a byproduct.

2. The process of treating substances containing lead and other sulfids, consisting in subjecting the substance to the action of chlorin gas in the presence of moisture at a temperature high enough to convert substantially the entire lead content into lead sulfate with hydrochloric acid as a byproduct, dissolving the lead sulphate with hot concentrated brine, thereby causing double decomposition and forming lead chlorid in solution, cooling the solution to precipitate the lead chlorid, treating the lead chlorid to recover the lead and chlorin gas, and utilizing said chlorin gas to attack a new initial batch of the substance.

In testimony whereof I affix my signature in presence of two witnesses as follows:

JOHN L. MALM.

Witnesses:
G. O. FARQUHARSON,
C. H. SHOTZBARGER.